(12) United States Patent
Nakayama et al.

(10) Patent No.: US 6,668,652 B2
(45) Date of Patent: Dec. 30, 2003

(54) NANO-SUBSTANCE MASS MEASUREMENT METHOD AND APPARATUS

(75) Inventors: Yoshikazu Nakayama, 9-404, 14-2, Konigaoka 1-chome, Hirakata-City, Osaka, 573-0084 (JP); Akio Harada, Osaka (JP)

(73) Assignees: Yoshikazu Nakayama, Osaka (JP); Daiken Chemical Co., Ltd., Osaka (JP)

( * ) Notice: Subject to any disclaimer, the term of this patent is extended or adjusted under 35 U.S.C. 154(b) by 0 days.

(21) Appl. No.: 10/155,039

(22) Filed: May 24, 2002

(65) Prior Publication Data
US 2003/0011389 A1 Jan. 16, 2003

(30) Foreign Application Priority Data
May 28, 2001 (JP) ........................................ 2001-158387

(51) Int. Cl.[7] .................................................. G01G 3/16
(52) U.S. Cl. .................................... 73/580; 177/210 FP
(58) Field of Search ............... 73/579, 580; 177/210 FP (56) References Cited
U.S. PATENT DOCUMENTS
3,926,271 A  * 12/1975  Patashnick ............... 177/210 R
4,838,369 A  *  6/1989  Albert ..................... 177/210 FP FOREIGN PATENT DOCUMENTS
EP        0531828     *  8/1992
WO      200290246    * 11/2002

* cited by examiner

*Primary Examiner*—Hezron Williams
*Assistant Examiner*—Nashmiya Fayyaz
(74) *Attorney, Agent, or Firm*—Koda & Androlia

(57) ABSTRACT

A method for measuring the mass of nano-substances including the steps of gripping a nano-substance with a nanotweezer gripping portion made of a plurality of nanotubes, resonating the nanotweezer gripping portion in this gripping state, measuring a resulting first characteristic frequency, and obtaining the mass of the gripped nano-substance by comparing the first and second characteristic frequencies, where the second characteristic frequency is the characteristic frequency of the nanotweezer gripping portion with no nano-substance gripped thereby. The gripping portion is caused to resonate electrically by applying an AC voltage between the nanotweezer gripping portion and an electrode disposed near the nanotweezer gripping portion. The gripping portion is caused also to resonate mechanically by way of expanding and contracting a piezo-electric element disposed on a main body that supports the nanotweezer gripping portion.

6 Claims, 5 Drawing Sheets

NANO-SUBSTANCE MASS MEASUREMENT METHOD AND APPARATUS

BACKGROUND OF THE INVENTION

1. Field of the Invention

The present invention relates to nanotweezers that can grip and release nano-substances having a nano-scale size by opening and closing a plurality of nanotubes. More specifically, the present invention relates to a nano-substance mass measurement method and apparatus which can measure the mass of gripped nano-substances by measuring resonance frequencies of the gripping portion of the nanotweezers before and after the gripping of the nano-substances.

2. Prior Art

Generally, mass analysis methods are used as methods for measuring the mass of extremely small substances such as atoms, molecules, etc. In such mass analysis methods, a sample is ionized, and the ions are accelerated by means of an electric field so that the traveling velocity is caused to vary according to the mass. Then, the ion current is separated according to the specific charge e/m or m/e by rotation in a magnetic field, and the mass of the ions is deduced from the respective peaks in the mass spectrum.

The mass analysis method has the advantage of allowing precise measurements of the mass of relatively light substances such as atoms and molecules. However, this method is unsuitable for measuring the mass of nano-substances such as extremely small particles formed by the aggregation of 100 to 10,000 atoms.

The mass of such nano-substances is larger than the mass of atoms. Accordingly, even if these nano-substances are ionized by electron bombardment or high-frequency spark discharge, an ultra-high-intensity electric field is required in order to cause the ions to travel through space; and in order to realize such an electric field, it is inevitable that the apparatus to be used becomes excessively large in size. Furthermore, even if it is possible to cause the ions to travel through space, since the ions have a large inertia, an extremely large magnetic field is required for rotation of the ions. Consequently, the overall size of the apparatus used needs to be extremely large as in the case described above.

Devices that create heavy ion beams have been realized in research of atomic nuclei, etc. However, these devices are extremely large in size, and thus an extremely large apparatus is thus required even at the level of heavy ions. Accordingly, in cases where the mass of nano-substances or nano-particles that are even larger than heavy ions are to be measured by ionization, such measurements are virtually impossible when the above-described mass analysis method is used in terms of both cost and practicality.

SUMMARY OF THE INVENTION

Accordingly, the object of the present invention is to provide a nano-substance mass measurement method and apparatus in which, without using an ionizing device, electric field accelerating device or magnetic field rotating device, the mass of nano-substances is obtained in an extremely simple manner by way of griping nano-substances with nanotweezers that have nanotubes etc. at the tip ends thereof and measuring resonance frequencies of the nanotweezers before and after such gripping.

The present invention is a nano-substance mass measurement method characterized in that, with the use of nanotweezers that are capable of gripping and releasing nano-size nano-substances, a nano-substances is gripped by the nanotweezer gripping portion of the nanotweezers, the nanotweezer gripping portion in this gripping state is caused to resonate, the resulting characteristic frequency $f_m$ is measured, and the mass of the gripped nano-substance is obtained by comparing two characteristic frequencies $f_m$ and $f_o$ where $f_o$ is the characteristic frequency of the gripping portion of the nanotweezers which is in a state that no nano-substance is gripped.

In the above nano-substance mass measurement method of the present invention, the nanotweezer gripping portion is formed by the tip end portions of a plurality of nanotubes.

Furthermore, in the nano-substance mass measurement method according to the present invention, an external electrode is caused to approach the gripping portion of the nanotweezers, and an AC voltage is applied across the gripping portion of the nanotweezers and the external electrode so that the gripping portion of the nanotweezers is caused to resonate by AC electrostatic induction, thus measuring the characteristic frequencies $f_o$ and $f_m$.

Also in the nano-substance mass measurement method of the present invention, a piezo-electric element is provided in the nanotweezer main body which has the nanotweezer gripping portion on the tip end, and the nanotweezer gripping portion is caused to resonate by applying an AC voltage to this piezo-electric element, thus measuring the characteristic frequencies $f_o$ and $f_m$.

The present invention is also a nano-substance mass measuring apparatus which is comprised of: a nanotweezer main body to which the base end portions of a plurality of nanotubes are fastened, a nanotweezer gripping portion that is formed by the tip end portions of the nanotubes, a means which controls the nanotweezer gripping portion so that the gripping portion can be freely opened and closed, an external electrode that is disposed in close proximity to the nanotweezer gripping portion, and an AC power supply which applies an AC voltage used for resonance across the nanotweezer gripping portion and the external electrode.

Furthermore, the present invention is a nano-substance mass measuring apparatus which is comprised of a nanotweezer main body to which the base end portions of a plurality of nanotubes are fastened, a nanotweezer gripping portion that is formed by the tip end portions of the nanotubes, a means which controls the nanotweezer gripping portion so that the gripping portion can be freely opened and closed, a piezo-electric element which is provided in the nanotweezers, and an AC power supply which applies an AC voltage used for resonance to the piezo-electric element.

DETAILED DESCRIPTION OF THE INVENTION

The inventors of the present application have proposed nanotweezers as a device for gripping and releasing nano-substances in Japanese Patent Application Nos. 2000-112767 and 2000-404006. In these nanotweezers, the base end portions of a plurality of nanotubes are fastened to a nanotweezer main body; and by way of controlling the tip end portions of the nanotubes by means of static electricity or a piezo-electric element, the tip end portions of the nanotubes are opened and closed, thus gripping and releasing the nano-substances.

The inventors noted that the resonance frequency of the nanotubes varies before and after the nano-substance is gripped by the nanotweezer gripping portion and inferred that it might be possible to measure the mass of the nano-substance from the amount of such variations.

The mass of one H atom is $1.6 \times 10^{-24}$ g, and the mass of one heavy Bi atom is $3.3 \times 10^{-22}$ g. If nano-substances are viewed as substances formed by the aggregation of approximately 1,000 to 1,000,000 atoms, then the mass of such nano-substances can be considered to be approximately $10^{-21}$ g to $10^{-16}$ g.

On the other hand, when the mass of one carbon nanotube is considered as a typical example of a nanotube, though carbon nanotubes are hollow, if such carbon nanotubes are tentatively viewed as solid graphite rods, then the mass of a carbon nanotube that has a diameter of 20 nm and a length of 1 µm is:

$$m = \rho AL = 2.3(g/cm^3) \times \pi \times 10^2 (10^{-18}\ m^2) \times 10^{-6}(m) = 7.2 \times 10^{-16}\ g.$$

Considering that actual carbon nanotubes are hollow, and the diameter of such nanotubes can be made even smaller, the mass of one carbon nanotube can be viewed as being in the range of $10^{-16}$ g to $10^{-17}$ g. Meanwhile, the mass of nano-substances is $10^{-21}$ g to $10^{-16}$ g. Accordingly, when such nano-substances are gripped by carbon nanotubes, the resonance frequency of the nanotubes should vary significantly. Accordingly, it would appear to be possible to perform a back calculation of the mass of such a nano-substance from the amount of variation in the resonance frequency.

Accordingly, in order to devise a model for measuring the above-described resonance frequency, the main body of the nanotweezers developed by the inventors is viewed as a wall body, and the tip end portion of the nanotube is viewed as a cantilever beam protruding from this wall body. The characteristic frequency of this cantilever beam, i.e., the resonance frequency, is considered as described in the paragraphs below.

Figure 1:
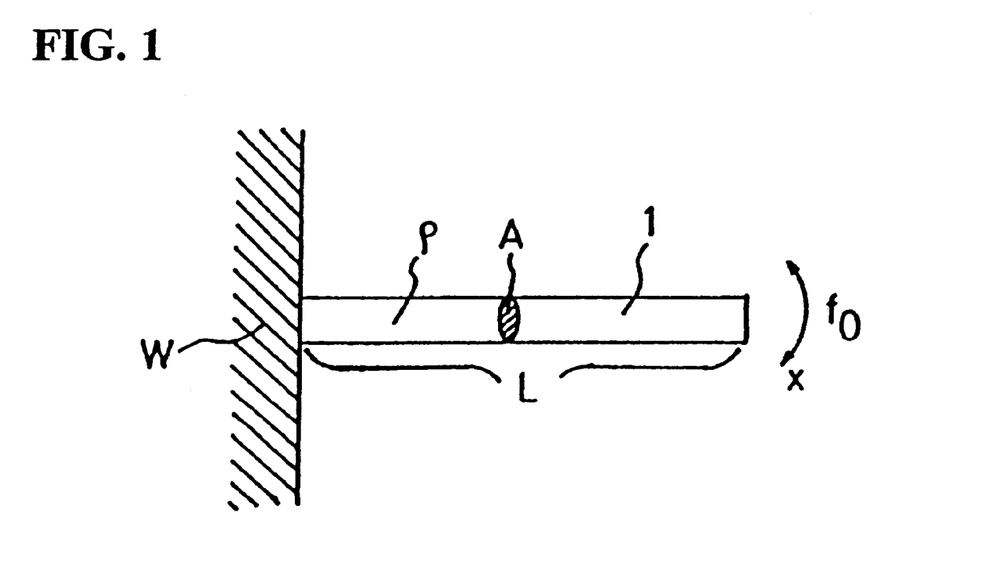
FIG. 1 is a model diagram illustrating the characteristic vibration of a cantilever beam that constitutes the principle of the present invention.

FIG. 1 is a model diagram illustrating the characteristic vibration of a cantilever beam that constitutes the principle of the present invention. A cantilever beam 1 with a volumetric density of ρ, a cross-sectional area of A and a length of L protrudes from the wall body W. When this cantilever beam 1 undergoes bending vibration, the solution of the Newton equations of motion indicates that the characteristic frequency $f_o$ for n=1 is given by the following equation:

$$f_o = (\tfrac{1}{2}\pi)(1.875/L)^2 (EI/\rho A)^{1/2}$$

where E is the longitudinal elastic coefficient of the material of the cantilever beam, and I is the cross-sectional secondary moment thereof.

Figure 2:
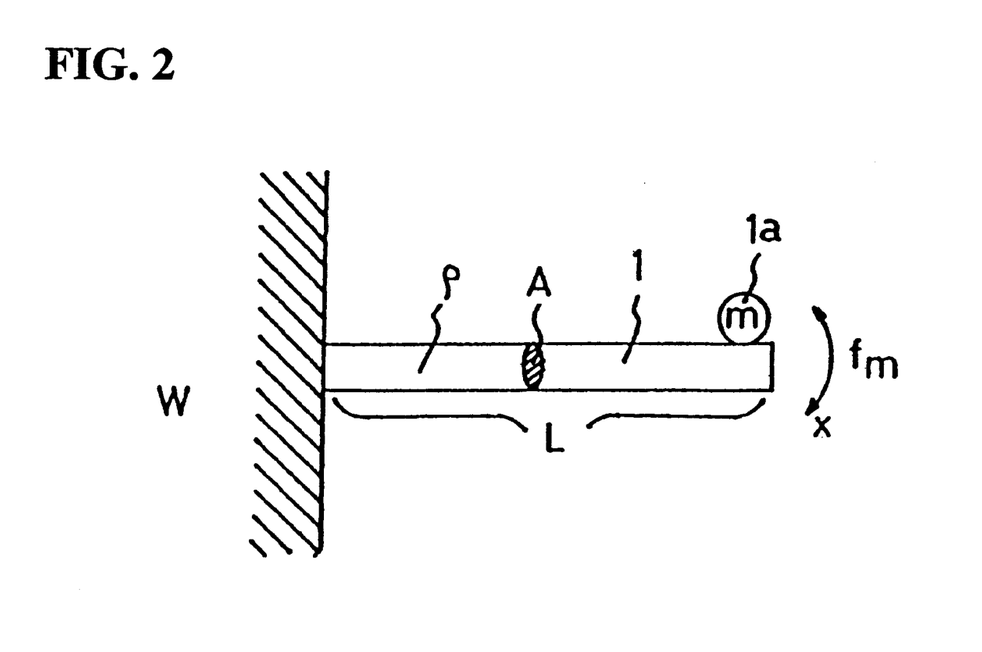
FIG. 2 is a model diagram illustrating the characteristic vibration of a cantilever beam that supports a mass point, constituting the principle of the present invention.

FIG. 2 is a model diagram illustrating the characteristic vibration of a cantilever beam that supports a mass point, which constitutes the principle of the present invention. A mass point 1a of mass m is supported on the tip end of the cantilever beam 1. When this cantilever beam 1 undergoes bending vibration, it is seen that the characteristic frequency $f_m$ is given by the following equation when solved using the method of Rayleigh:

$$f_m = (\tfrac{1}{2}\pi)(1.875/L)^2 (0.246/(0.227+\mu))^{1/2} (EI/\rho A)^{1/2}$$

where $\mu = m/\rho AL$.

Accordingly, the ratio of these characteristic frequencies is given by the equation $f_m/f_o = (0.246/(0.227+\mu))^{1/2}$. From this equation, $m = \{0.246(f_o/f_m)^2 - 0.227\}\rho AL$, so that the mass m of the nano-substance can be obtained from the characteristic frequencies $f_o$ and $f_m$ and the mass ρAL of the carbon nanotube.

The above equation can be simplified even further. If the coefficients 0.246 and 0.227 are approximated by 0.24, and $f_m$ is set equal to $f_o - \Delta f$, then the very small terms of the second order or higher can be ignored, so that $m = 0.48(\Delta f/f_o)\rho AL$. Assuming that $\rho AL = 10^{-16}$ g to $10^{-17}$ g as described above, and that $\Delta f/f_o$ can be measured down to values on the order of $10^{-3}$, it was found that the mass can be calculated down to values of $m = 10^{-19}$ g to $10^{-20}$ g.

As described above, it may be predicted that the mass of nano-substances will be in the range of $10^{-21}$ g to $10^{-16}$ g. Accordingly, this mass range is more or less included within the above-described measurement limit ($10^{-20}$ g), thus sufficiently indicating that the mass of nano-substances can be measured by the method of the present invention. Assuming that $\Delta f/f_o$ can be measured down to the order of $10^{-4}$, then the measurement limit for ρAL is $10^{-21}$ g, so that the predicted range of nano-substance mass is all included in the measurable range.

Figure 3:
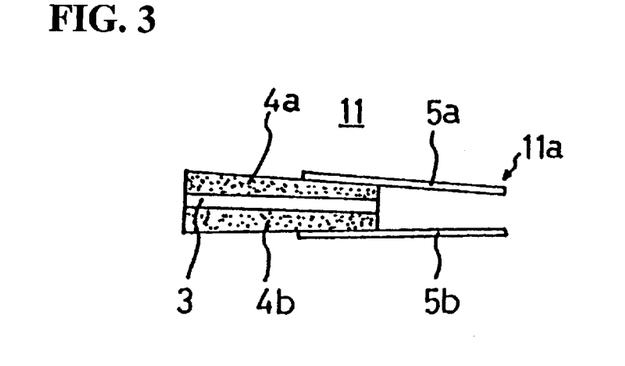
FIG. 3 is a schematic diagram of the nanotweezers.

FIG. 3 is a schematic diagram of the nanotweezers. The nanotweezers 11 are constructed by forming electrodes 4a and 4b on a main body 3 and fastening the base end portions of nanotubes 5a and 5b to the respective electrodes. A nanotweezer gripping portion 11a is formed by the tip end portions of the nanotubes 5a and 5b.

Figure 4:
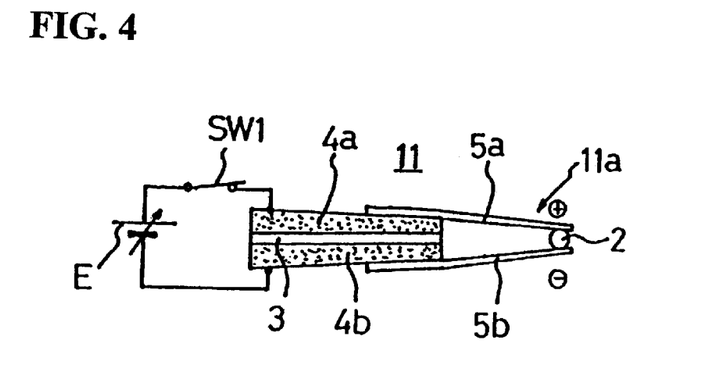
FIG. 4 is a schematic diagram showing the nanotweezers gripping a nano-substance.

FIG. 4 is a schematic diagram showing the nanotweezers gripping a nano-substance. A DC power supply E is connected between the electrodes 4a and 4b via a switch SW1. Positive and negative static charges are induced in the nanotubes 5a and 5b by this DC power supply E, so that the tip ends of the nanotubes 5a and 5b, i.e., the gripping portion 11a, is closed by an electrostatic attractive force, thus gripping the nano-substance 2.

Carbon nanotubes are conductive nanotubes; and when the gripping portion 11a is constructed from such conductive nanotubes, insulating or semiconductor nano-substances 2 can be easily gripped by the electrostatic attractive force. However, when the conductive nano-substance 2 is gripped, the tip ends of the gripping portions 11a are electrically connected via the nano-substance 2, and the electrostatic attractive force may drop.

However, by way of coating the surfaces of conductive nanotubes such as carbon nanotubes, etc. with an insulating film and by way of using these coated nanotubes as the nanotubes 5a and 5b, nano-substances 2 with a broad range of electrical properties can be gripped regardless of the conductive or insulating property of the nano-substances.

Figure 5:
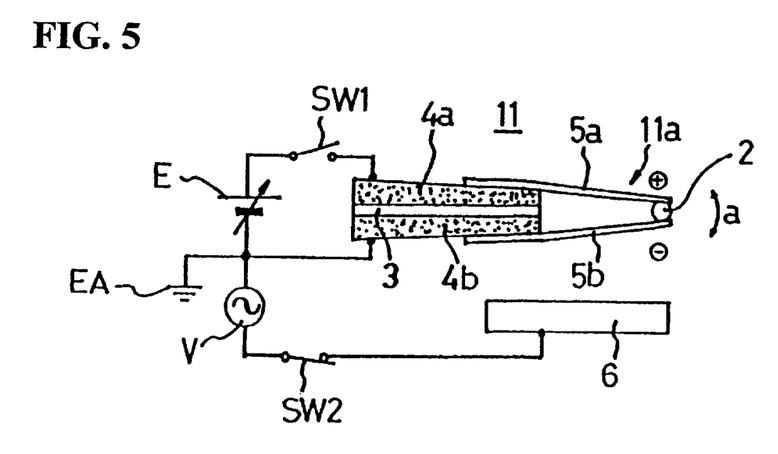
FIG. 5 is a structural diagram of the first embodiment of the present invention in which the nanotweezers gripping a nano-substance are caused to resonate by AC electrostatic induction.

FIG. 5 is a structural diagram of the first embodiment of the present invention in which the nanotweezers gripping the nano-substance are caused to resonate by AC electrostatic induction.

An external electrode 6 is disposed in close proximity to the gripping portion 11a, and an AC power supply V is attached between the external electrode 6 and the nanotweezers 11 via a switch SW2. When an AC voltage is applied by this AC power supply V, AC electrostatic induction occurs between the gripping portion 11a and external electrode 6. As a result, the gripping portion 11a is forcibly caused to vibrate.

Figure 6:
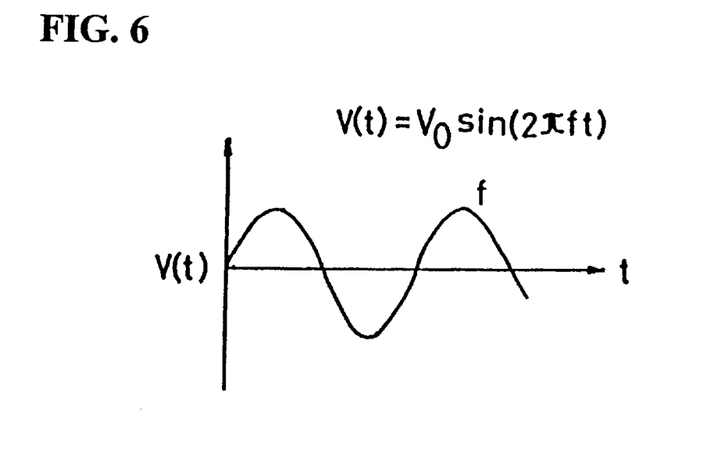
FIG. 6 is a schematic waveform diagram of the AC voltage that is applied in order to cause the nanotweezers to resonate.

FIG. 6 is a schematic waveform diagram of the AC voltage that is applied in order to cause the nanotweezers to resonate. The AC voltage V(t) is given by the equation $V(t)=V_o \sin(2\pi ft)$, and an AC voltage of frequency f is applied from the external electrode 6.

Figure 7:
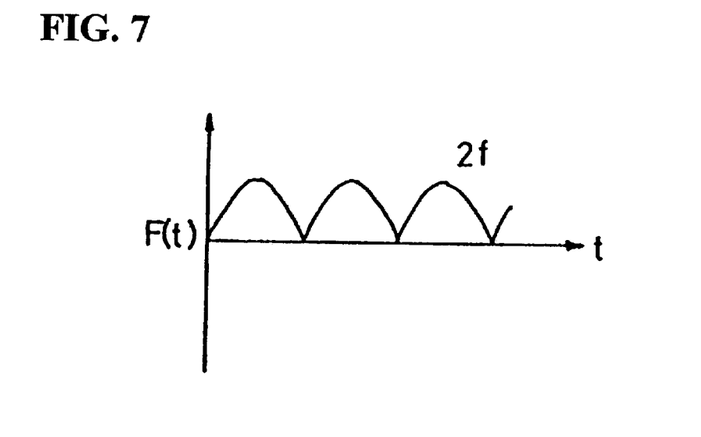
FIG. 7 is a schematic waveform diagram of the force that acts on the nanotweezers as a result of AC electrostatic induction.

FIG. 7 is a schematic waveform diagram of the force that acts on the nanotweezers as a result of AC electrostatic induction.

When a positive charge is induced in the external electrode 6, a negative charge is induced in the gripping portion 11a; and when a negative charge is induced in the external electrode 6, a positive charge is induced in the gripping portion 11a. In other words, an electrostatic attractive force that acts on the gripping portion 11a is generated twice during one period of the AC voltage; accordingly, the frequency of the AC electrostatic attractive force F(t) is 2 f. Consequently, the nanotweezer gripping portion 11a vibrates at a frequency of 2 f.

Figure 8:
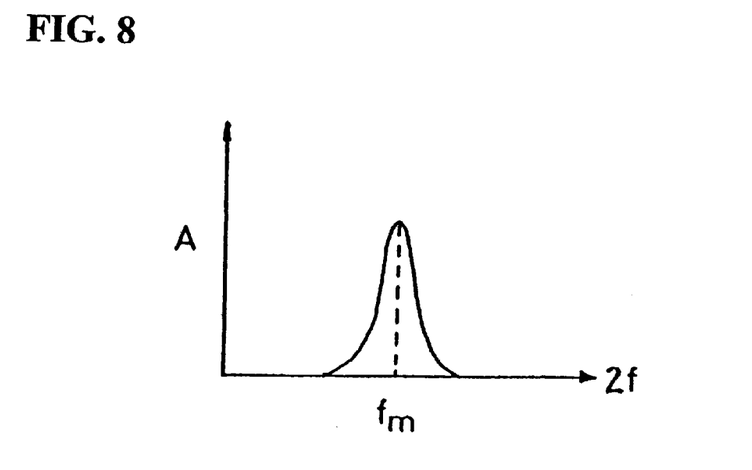
FIG. 8 is a resonance diagram illustrating the relationship between the amplitude and frequency of the nanotweezer gripping portion.

FIG. 8 is a resonance diagram illustrating the relationship between the amplitude and frequency of the nanotweezer gripping portion.

As the frequency of the AC voltage applied to the nanotweezers 11 is gradually increased, the gripping portion 11a begins a forced vibration with an amplitude of A; when the amplitude A reaches a maximum at the frequency $f_m$, the nanotweezers 11 may be viewed as being in a resonant state. In other words, the forced vibration reaches the maximum when the frequency 2f applied by the AC voltage coincides with the characteristic frequency of the gripping portion 11a. This resonant state can be confirmed under an electron microscope and can also be confirmed by observing the phase change of the current in AC electrostatic induction.

Accordingly, when the nanotweezers 11 are in a resonant state, a value that is twice the frequency of the AC voltage coincides with the characteristic frequency $f_m$ of the gripping portion 11a. In this way, the characteristic frequency $f_o$ of the gripping portion 11a in a state in which a nano-substance 2 is not gripped and the characteristic frequency $f_m$ of the gripping portion 11a in a state in which a nano-substance 2 is gripped are measured.

When the characteristic frequencies $f_o$ and $f_m$ are measured, the mass m of the nano-substance 2 can be obtained from the equation $$m=\{0.246(f_o/f_m)^2 - 0.22756\}\rho AL$$

or the equation $$m=0.48(\Delta f/f_o)\rho AL=0.48((f_o-f_m)/f_o)\rho AL$$

where $\rho AL$ is the mass of the gripping portion 11a.

Figure 9:
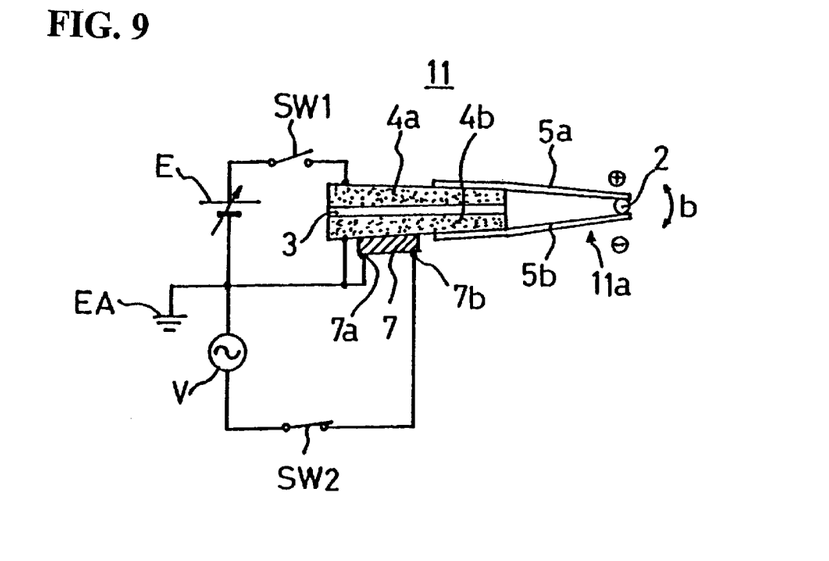
FIG. 9 is a structural diagram of the second embodiment of the present invention in which the nanotweezers gripping a nano-substance are caused to resonate by a piezo-electric element.

FIG. 9 is a structural diagram of the second embodiment of the present invention in which the nanotweezers gripping the nano-substance are caused to resonate by means of a piezo-electric element.

Here, a piezo-electric element 7 is formed as a coating film provided on the electrode 4b, and an AC power supply V is connected via terminals 7a and 7b so that an AC voltage can be applied to both ends of this piezo-electric element 7.

When an AC voltage V(t) is applied to the piezo-electric element 7, the piezo-electric element 7 make a stretching vibration according to its own frequency f, and thus causes a forced vibration of the gripping portion 11a at this frequency f. The gripping portion 11a resonates at a maximum amplitude when the frequency f coincides with the above-described characteristic frequency $f_o$ or $f_m$. The above-described characteristic frequency $f_o$ or $f_m$ can be measured by reading the AC frequency in this resonant state.

In cases where the gripping portion 11a is caused to resonate mechanically by means of the piezo-electric element 7, the material of the nanotubes is not particularly relevant. Accordingly, the gripping portion 11a can be caused to resonate regardless of whether the nanotubes are made of a conductive material, semiconductor material or insulating material. The reason for this is that electrical short-circuiting does not occur because an electrostatic attractive force is not used. Accordingly, not only conductive nanotubes such as carbon nanotubes, but also insulating nanotubes such as BN type nanotubes or BCN type nanotubes, can be used in the present invention.

Furthermore, besides the electrostatic opening-and-closing mechanism, an opening-and-closing mechanism that uses piezo-electric films can be used also as the opening-and-closing mechanism of the nanotweezer gripping portion 11a. In such a mechanism, piezoelectric films are formed as coating films on the nanotubes 5a and 5b, and the nanotubes 5a and 5b are buckled or extended by applying a voltage to these piezo-electric films so that the nanotubes 5a and 5b are caused to expand or contract. As a result, the nanotweezer gripping portion 11a is controlled so as to open and close. In this case, both the AC electrostatic induction shown in FIG. 5 and the mechanical vibration caused by a piezo-electric element shown in FIG. 9 can be used to measure the characteristic frequencies.

Figure 10:
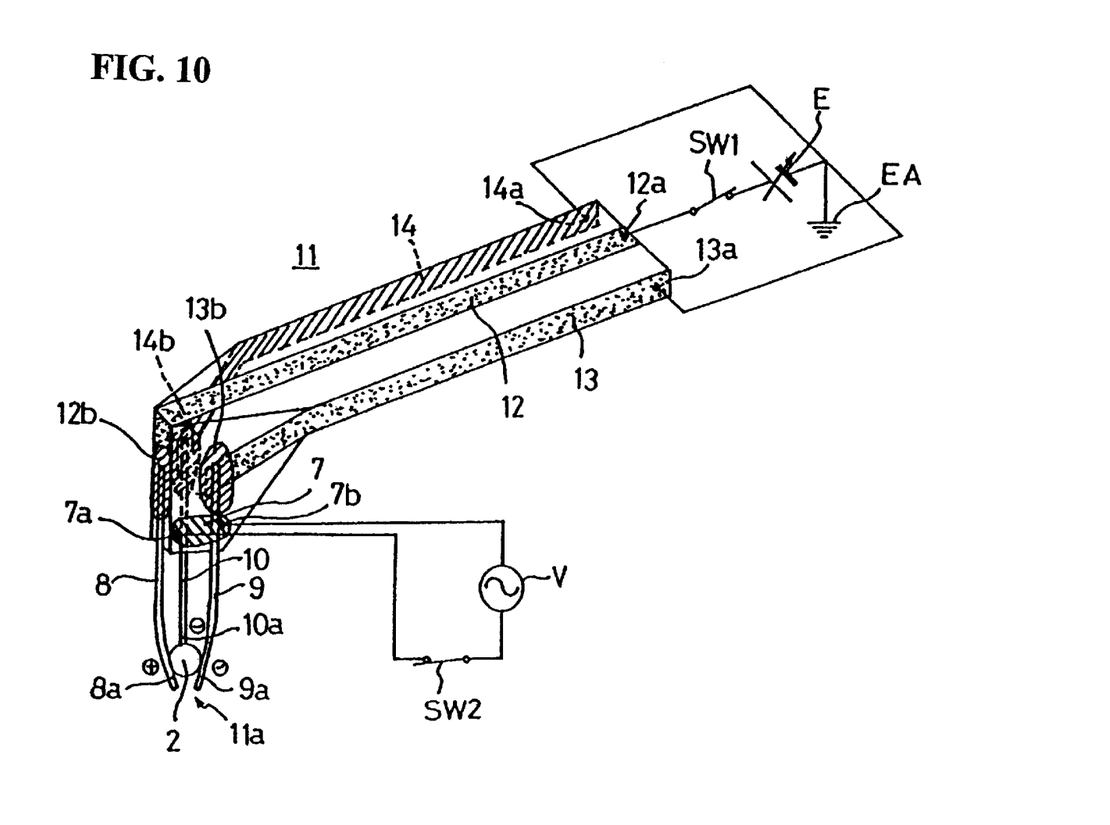
FIG. 10 is a structural diagram of the third embodiment of the present invention in which nanotweezers that use three nanotubes are caused to resonate by a piezo-electric element.

FIG. 10 is a structural diagram of the third embodiment of the present invention in which nanotweezers that use three nanotubes are caused to resonate by a piezo-electric element. In this embodiment, the nanotweezers 11 are constructed using an AFM cantilever. Here, "AFM" refers to "atomic force microscope".

Lead electrodes 12, 13 and 14 are formed on a cantilever, and the base end portions of nanotubes 8, 9 and 10 are set so as to be in contact with the tip ends of these lead electrodes. The nanotubes are fastened in place by coating films 12b, 13b and 14b, thus forming the nanotweezers 11.

A switch SW1 and a DC power supply E are connected to terminals 12a, 13a and 14a located on the rear ends of the lead electrodes 12, 13 and 14; and the negative electrode of the DC power supply E is connected to the ground EA. The nanotube tip end 8a is positively charged, and the nanotube tip ends 9a and 10a are negatively charged, by this DC power supply E.

Since the gripping portion 11a is constructed from three nanotube tip ends 8a, 9a and 10a, a nano-substance 2 of any shape can be securely gripped. The nano-substance 2 is gripped and released by opening and closing the switch SW1 and thus opening and closing the gripping portion 11a.

A piezo-electric element 7 made of a piezo-electric substance formed into a film is provided in the vicinity of the coating film 13b. An AC power supply V is connected, via a switch SW2, to terminals 7a and 7b located on both ends of the piezo-electric element 7. When the AC power supply V is applied, the piezo-electric element 7 undergoes stretching vibration, and the gripping portion 11a is forcibly caused to vibrate. The resonant state of the gripping portion 11a can be observed under an electron microscope.

The resonance frequencies in a case where no nano-substance 2 is gripped and in a case where a nano-substance 2 is gripped give the characteristic frequencies $f_o$ and $f_m$ for the respective cases. Accordingly, the mass of the nano-substance 2 can be obtained from these frequencies using the above-described equations.

Figure 11:
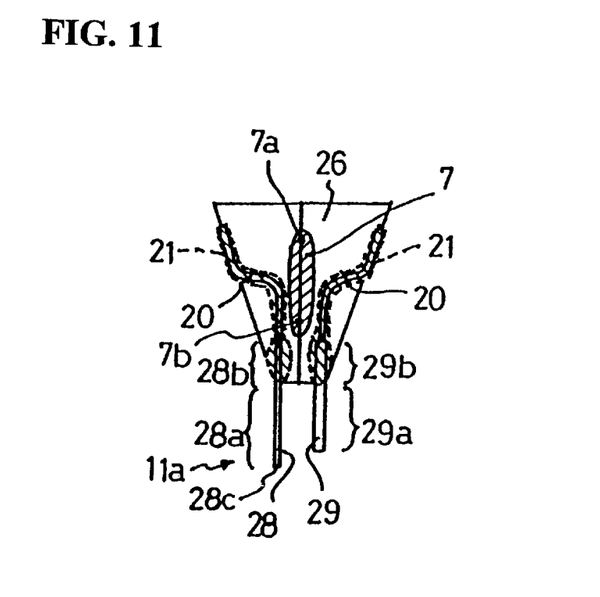
FIG. 11 is a structural diagram of the fourth embodiment of the present invention in which nanotweezers that are also capable of an AFM operation are caused to resonate by a piezo-electric element.

FIG. 11 is a structural diagram of the fourth embodiment of the present invention in which nanotweezers that are also capable of an AFM operation are caused to resonate by a piezo-electric element.

The nanotweezer gripping portion 11a of the nanotweezers is formed by two nanotubes 28 and 29. The nanotube 28 protrudes further down than the nanotube 29, and an AFM operation is performed by the tip end 28c of the nanotube 28. The operation for setting the nanotube tip end portion 28a to a length that is longer than the length of the nanotube tip end portion 29a is performed under an electron microscope.

Nanotube lead wires 20 and 20 are connected to the base end portions 28b and 29b of the nanotubes 28 and 29, and the upper surfaces of the lead wires are fastened to the main body 26 by coating films 21 and 21. A piezo-electric element 7 is formed as a film on the main body 26, and an AC voltage is applied to terminals 7a and 7b on both ends of the piezoelectric element 7.

Figure 12:
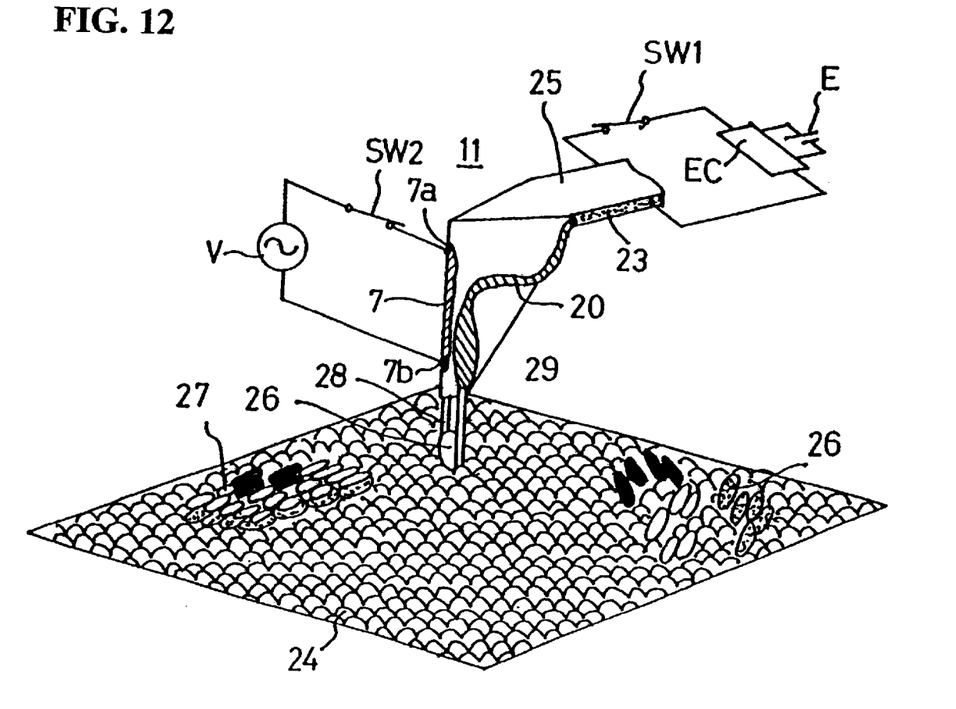
FIG. 12 is an explanatory diagram illustrating the operation of a nano-manipulator device which constructs nano-structures while measuring the mass of nano-substances.

FIG. 12 is an explanatory diagram illustrating the operation of a nano-manipulator device that constructs a nano-structure while measuring the mass of nano-substances.

In this manipulator device, the nanotweezers 11 shown in FIG. 11 are employed using a cantilever 25; and the nanotube lead wires 20 are connected, via electrodes 23, to switch SW1, a DC power supply E and a DC voltage control circuit EC. The open and close operation of the nanotubes 28 and 29 is controlled by varying the DC voltage.

A switch SW2 and an AC power supply V are connected to the terminals 7a and 7b of the piezo-electric element 7.

First, a search is made for the collection site of a nano-substance 26 by way of scanning the sample surface 24 using the nanotube tip end 28c as a probe needle. Once the location of the nano-substance 26 is found, the nano-substance 26 is positioned between the nanotube tip end portions 28a and 29a, and the gripping portion 11a is closed by turning on the switch SW1, thus securely holding the nano-substance 26.

Next, the switch SW2 is turned on so as to resonate the gripping portion 11a by the AC power supply V, and the mass of the nano-substance 26 is measured, thus identifying the kind of the nano-substance 26. Afterward, the sample surface 24 is subjected to AFM scanning by the nanotube tip end 28c, so that the gripping portion 11a is moved to the position of a nano-structure 27. After the required position of the nano-structure 27 has been found by AFM scanning, and the gripping portion 11a has been moved to this position, the switch SW1 is turned off, thus releasing the nano-substance 26. The nano-structure 27 is built by repeating this operation.

The present invention is not limited to the embodiments described above. Various modifications, design alterations, etc. that do not involve any departure from the technical concept of the present invention are included in the technical scope of the present invention.

As seen from the above, in the present invention, the characteristic frequency $f_m$ of the nanotweezer gripping portion gripping the nano-substance is measured utilizing the phenomenon of resonance, and the mass of the nano-substance is measured merely by performing a calculation that compares this characteristic frequency $f_m$ to the characteristic frequency $f_o$ that is obtained by the nanotweezer gripping portion which is not gripping a nano-substance. Accordingly, the mass of nano-substances down to approximately $10^{-20}$ g can be quickly obtained using an extremely simple structure. Thus, a nano-substance mass measurement method, which constitutes a breakthrough in the fields of semiconductors and molecular biology and in other research fields and manufacturing technology fields that handle nano-substances, can be provided.

Furthermore, the nanotweezer gripping portion is constructed from the tip end portions of a plurality of nanotubes. Accordingly, the respective nanotubes are freely controlled, and an efficient nano-substance mass measurement method is provided.

In addition, the characteristic frequencies $f_o$ and $f_m$ are measured merely by causing an external electrode to approach the nanotweezer gripping portion, applying an AC voltage across the external electrode and nanotweezer gripping portion, and then causing the gripping portion to resonate by means of AC electrostatic induction. Accordingly, a nano-substance mass measurement method with high utility which can handle nanotweezers of various configurations by means of an extremely simple structure is provided.

Also in the present invention, a piezo-electric element is provided in the main body of the nanotweezers, and the nanotweezer gripping portion is caused to resonate by applying an AC voltage to this piezo-electric element. Accordingly, a mass measurement method which makes it possible to measure the mass of nano-substances that have conductive properties, semiconductor properties and insulating properties is provided.

Furthermore, according to the present invention, an apparatus that allows quick measurement of the mass of nano-substances using the phenomenon of resonance caused by AC electrostatic induction is provided by an extremely simple structure that includes a nanotweezer gripping portion, an external electrode and an AC power supply.

Also, according to the present invention, an apparatus that allows quick and accurate measurement of the mass of nano-substances using the phenomenon of mechanical resonance caused by a piezo-electric element is provided by an extremely simple structure that includes a nanotweezer gripping portion, a piezo-electric element and an AC power supply.

What is claimed is:

1. A nano-substance mass measurement method that uses nanotweezers capable of gripping and releasing nano-size nano-substances, said method comprising the steps of:

gripping a nano-substance with nanotweezer gripping portions of said nanotweezers, causing said nanotweezer gripping portions thus gripping said nano-substance to resonate, and measuring a resulting characteristic resonant frequency $f_m$, and obtaining a mass of said nano-substance gripped by comparing said characteristic frequency $f_m$ and a characteristic resonant frequency $f_o$, said $f_o$ being a characteristic frequency $f_o$ of said gripping portions in which no nano-substance is gripped thereby.

2. The nano-substance mass measurement method according to claim 1, wherein said nanotweezer gripping portions are formed by tip end portions of at least two nanotubes.

3. The nano-substance mass measurement method according to claim 1, wherein said characteristic resonant frequency $f_m$ and said characteristic frequency $f_o$ are measured respectively by:

causing an external electrode to approach said nanotweezer gripping portions, and applying an AC voltage across said nanotweezer gripping portions and said external electrode, thus causing said nanotweezer gripping portions to resonate by AC electrostatic induction.

4. The nano-substance mass measurement method according to claim 1, wherein said characteristic resonant frequency $f_m$ and said characteristic frequency $f_o$ are measured respectively by:

applying an AC voltage to a piezo-electric element that is provided in a main body of said nanotweezers which has said nanotweezer gripping portions on tip ends thereof, and causing said gripping portions of said nanotweezers to resonate.

5. A nano-substance mass measuring apparatus comprising:

a nanotweezer main body to which base end portions of at least two nanotubes are fastened, nanotweezer gripping portions formed by tip end portions of said nanotubes for gripping a nano-substance, a control means that controls said nanotweezer gripping portion so that said gripping portions are freely opened and closed, an external electrode which is disposed in close proximity to said nanotweezer gripping portions, and an AC power supply which applies an AC voltage for resonating said nanotweezer gripping portions and external electrode to measure a mass of said nano-substance.

6. A nano-substance mass measuring apparatus comprising:

a nanotweezer main body to which base end portions of at least two nanotubes are fastened, nanotweezer gripping portions fanned by tip end portions of said nanotubes for gripping a nano-substance, a control means that controls said nanotweezer gripping portions that said gripping portions are freely opened and closed, a piezo-electric element provided in and coupled to said nanotweezer gripping portions, and an AC power supply which applies an AC voltage for resonating said piezo-electric element to measure a mass of said nano-substance.

* * * * *